(12) United States Patent
Fiorillo et al.

(10) Patent No.: US 8,270,573 B2
(45) Date of Patent: Sep. 18, 2012

(54) LAWFUL INTERCEPTION OF PERSONALIZED RING BACK TONES

(75) Inventors: Lorenzo Fiorillo, San Nicola la Strada (IT); Enrico De Luca, Caserta (IT); Luca Di Serio, Fidenza (IT); Pompeo Santoro, Baronissi (IT); Linda Landi, Battipaglia (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1420 days.

(21) Appl. No.: 11/721,584

(22) PCT Filed: Nov. 4, 2005

(86) PCT No.: PCT/EP2005/055765
§ 371 (c)(1),
(2), (4) Date: Aug. 29, 2007

(87) PCT Pub. No.: WO2006/063903
PCT Pub. Date: Jun. 22, 2006

(65) Prior Publication Data
US 2008/0165940 A1     Jul. 10, 2008

(30) Foreign Application Priority Data
Dec. 16, 2004   (EP) ..................................... 04445128

(51) Int. Cl.
*H04M 1/24*   (2006.01)
*H04M 3/08*   (2006.01)
*H04M 3/22*   (2006.01)

(52) U.S. Cl. ...................................... 379/35; 379/32.01
(58) Field of Classification Search .... 379/32.01–32.05, 379/35; 455/410
See application file for complete search history.

(56) References Cited

U.S. PATENT DOCUMENTS

| | | | |
|---|---|---|---|
| 5,598,461 A | 1/1997 | Greenberg | |
| 6,549,613 B1 * | 4/2003 | Dikmen | 379/70 |
| 6,947,525 B2 * | 9/2005 | Benco | 379/35 |
| 7,274,662 B1 * | 9/2007 | Kalmanek et al. | 370/230 |
| 2002/0051518 A1 * | 5/2002 | Bondy et al. | 379/35 |
| 2003/0179747 A1 * | 9/2003 | Pyke et al. | 370/389 |
| 2004/0120471 A1 | 6/2004 | Benco | |
| 2004/0132435 A1 | 7/2004 | No et al. | |
| 2005/0117726 A1 * | 6/2005 | DeMent et al. | 379/142.01 |

FOREIGN PATENT DOCUMENTS

| | | |
|---|---|---|
| EP | 1 432 217 A | 6/2004 |
| WO | WO 00/27101 A | 5/2000 |

* cited by examiner

Primary Examiner — Quoc D Tran (57) ABSTRACT

Systems and methods for legal interception of the transmission of personalized ring back tones as they are sent from a network such as a mobile telephone network associated with a subscriber to a caller in response to a call placed by the caller to the subscriber to allow monitoring of personalized ring back tones and/or their associated call content data. The personalized ring back tone is intercepted at an intercept access point on the network, where the systems and methods of the invention then transmit the intercepted personalized ring back tone to an authorized person or entity, such as a law enforcement agency.

25 Claims, 3 Drawing Sheets

LAWFUL INTERCEPTION OF PERSONALIZED RING BACK TONES

FIELD OF THE INVENTION

The present invention relates generally to the mobile phone subscriber option known as personalized ring back tone service. More specifically, the present invention relates to systems and methods for the lawful interception of personalized ring back tones for electronic monitoring.

BACKGROUND OF THE INVENTION

A standard ring back tone is the "ring . . . ring" sound a person hears when placing a telephone call to another person before that other person answers the telephone. The ring back tone is a sound effect used to inform the person making the phone call that the connection towards the called device is being established and the called person is being alerted about the new incoming call.

A personalized ring back tone (PRBT) service lets a called party customize the ring back tone sound to anything of the called parties choosing. A personalized ring back tone service feature therefore enables a called party to play audio, such as a voice message, but also video or picture files, to a caller instead of the standard ring back tone when the called party is called by the specified caller.

The option of having a personalized ring back tone may be provided as a service for which a called party pays a nominal fee. Ring back tones are not stored on the telephone itself. Instead, ring back tones are stored on and played by a telephone network. As a result, they can be used with any telephone, including land line telephones, mobile telephones, Personal Digital Assistant (PDA) and Voice Over Internet Protocol (VoIP) communications devices.

Furthermore personalized ring back tones may be of an advanced sound quality approaching that of human speech. Therefore, a personalized ring back tone may include any file such as a song or voice recording, and may be of any type that the called party desires.

Because a personalized ring back tone may be customized by the called party for each individual caller, if caller A calls the called party, caller A may hear a specific unique personalized ring back tone that the called party has selected specifically for caller A. If caller B calls the called party, caller B may hear a different personalized ring back tone.

Call lists may be created by the called party, so that all of the callers belonging to one call list will hear the same personalized ring back tone and all other callers, or all callers belonging to a different call list will hear a different personalized ring back tone.

A personalized ring back tone can also be date, time, or location specific, meaning that caller A could receive one personalized ring back tone if he or she calls in the morning, on a particular day of the week, or from a particular location, and a different personalized ring back tone if he or she calls at a different time, day, or location.

The called party has complete control over exactly who hears which personalized ring back tone. As a result, a personalized ring back tone may be thought of as a personalized message selected by the called party that is automatically played to the selected caller or callers when a call is received, even if the called party never answers the telephone.

The personalized ring back tones may be stored as files in a database associated with a telephone network and may be retrieved with the assistance of a Gateway Mobile Switching Services Center (GMSC), in response to a call placed to a called party by a caller.

The Gateway Mobile Switching Services Center generally handles calls arriving from other networks and performs the switching of calls between mobile users and between mobile and fixed network users. This is what enables a land line or VoIP caller to hear a personalized ring back tone.

When the called party is under legal electronic surveillance by an authorized agency to monitor the called parties telephone conversation, the Mobile Switching Center (MSC) associated with the Gateway Mobile Services Switching Center is used as an intercept access point (IAP), and in-band signaling coming from the terminating Mobile Switching Center is intercepted. However, in-band signaling originating from the database associated with the network where personalized ring back tones are stored is not intercepted or monitored.

The personalized ring back tone, which originates from this database and not from the terminating Mobile Switching Center, is therefore not intercepted by currently available electronic monitoring systems. Therefore, the authorized agency implementing the electronic surveillance is not aware that a monitored called party is using personalized ring back tones to communicate with a caller.

Because the quality of personalized ring back tones may include normal sounding human speech, and because the called party may control which caller bears which personalized ring back tone, a problem arises in situations where a called party attempts to pass on communication to circumvent legal electronic surveillance methods.

For example, a law enforcement agency may be using electronic surveillance to monitor the telephone communications of the called party. This monitoring does not extend to either a ring back tone or a customized ring back tone. Therefore, a called party with criminal intent could use the personalized ring back tone to communicate messages to particular callers while avoiding legal electronic surveillance of the called party's telephone.

Such clandestine messages may be of a malevolent nature. For example, one may use this means of communication to relay a message regarding a planned criminal act. It is plain to see that personalized ring back tones may be used to covertly convey messages without the risk of electronic government surveillance to further the planning of common criminal acts, from drug dealing to conspiracy.

It is currently not possible to monitor a ring back tone or a personalized ring back tone for lawful interception purposes. An agency authorized to monitor a called party may be unaware that the called party is using a personalized ring back tone to send in-band information to specified callers. Since a warrant generally may be activated for data monitoring only, a personalized ring back tone may be lost if the agency authorized to monitor a called party is not aware that a personalized ring back tone is capable of communicating in a manner suitable for lawful interception purposes.

SUMMARY OF THE INVENTION

From the foregoing, it is apparent that there is a direct need to close this hole in authorized electronic surveillance by enabling authorized legal interception of a personalized ring back tone to gather evidence useful for criminal prosecution and to proactively prevent the commission of criminal acts.

Thus, the aim of the present invention is to overcome the above mentioned problems by providing systems and methods related to intercepting a personalized ring back tone stored on a location remote from the telephone when the personalized ring back tone is transmitted to a caller who is specified by the subscriber, where the subscriber is a party with personalized ring back tone service.

These problems and others are solved by introducing systems and methods for lawful interception of electronic communication that include interception of personalized ring back tone messages that are sent from the database where they are stored as part of the intercepted call content that is intercepted at an intercept access point and transmitted to an authorized agency. This allows authorized persons or agencies such as a law enforcement agency to monitor personalized ring back tones.

Intercepted information may also include events related to the personalized ring back tone, such as the date of transmission, time of transmission, telephone number of the subscriber, geographic location of the subscriber. These events are generally referred to as the call content data that is associated with the personalized ring back tone.

One aim of the present invention is to provide systems and methods for authorized interception of a subscriber with personalized ring back tone service.

In some embodiments, a subscriber may use a network including a Mobile Switching Center (MSC) as the intercept access point, however other nodes may also be used.

The systems and methods of the present invention may intercept personalized ring back tones on any of the Third Generation Partnership Project (3GPP), European Telecommunications Standards Institute (ETSI), American National Standards Institute (ANSI) or other standard telecommunications network architectures, consistent with the Communications Assistance for Law Enforcement Act (CALEA), which is a United States law requiring telephone network architectures be designed to enable authorized electronic interception.

Within this aim and in satisfaction of these needs, the present invention features systems and methods for the lawful interception of personalized ring back tones. To increase efficiency and reduce cost, the systems and methods of the present invention may be implemented to intercept personalized ring back tones on existing standardized telephone network architectures.

Moreover, the intercept access point for the interception of personalized ring back tones may occur at an existing Mobile Switching Center or equivalent of any communications network. This provides a robust solution compatible with existing networks and improves the ability of an authorized agency or person to lawfully monitor the communication of a subscriber.

The invention features systems and methods for the interception of electronic communication that allow authorized monitoring agencies to identify and intercept additional communication that is in the form of personalized ring back tones used by a subscriber for communication with callers.

This aim and others are achieved by a method for intercepting a transmission of a personalized ring back tone from a network associated with a subscriber to a caller, comprising: receiving a command to intercept a personalized ring back tone of a subscriber; identifying a subscriber identity of the subscriber; determining the existence of the personalized ring back tone associated with the subscriber based at least in part on the subscriber identity; intercepting the personalized ring back tone at an intercept access point as the personalized ring back tone is transmitted to a caller from a database for storing the personalized ring back tone, the database associated with a network that corresponds to the subscriber, in response to a call placed to the subscriber by the caller; and transmitting at least a portion of the personalized ring back tone to a recipient.

The above mentioned aim and others are also achieved by a system for intercepting a transmission of a personalized ring back tone from a network associated with a subscriber to a caller, comprising: a receiver capable of receiving a command to intercept a personalized ring back tone of a subscriber; a processor capable of identifying a subscriber identity of the subscriber; the processor capable of determining the existence of the personalized ring back tone associated with the subscriber based at least in part on the subscriber identity; an interceptor unit for intercepting the personalized ring back tone at an intercept access point as the personalized ring back tone is transmitted to a caller from a database for storing the personalized ring back tone, the database associated with a network that corresponds to the subscriber, in response to a call placed to the subscriber by the caller; and a transmitter for transmitting at least a portion of the personalized ring back tone to a recipient.

In certain embodiments, the invention may also include recording, at least temporarily, at least a portion of the personalized ring back tone transmitted to the caller from the database.

Various embodiments of the invention feature call content data associated with the subscriber's personalized ring back tone, where the call content data may include at least one of a telephone number associated with the subscriber, a date of transmission of the personalized ring back tone to the caller from the database where the personalized ring back tone is stored, the database associated with the telephone network that corresponds to the subscriber, a time of transmission of the personalized ring back tone to the caller from the database, and the geographic location of the subscriber when the personalized ring back tone is transmitted to the caller from the database.

The invention may also feature a C-node associated with the database, where the personalized ring back tone is stored on the C-node. Additionally, the recipient may include a law enforcement agency. The personalized ring back tone may include an audio file.

The above mentioned aim and others are also achieved by a system for intercepting a transmission of a personalized ring back tone, comprising: means for receiving a command to intercept a personalized ring back tone of a subscriber; means for identifying a subscriber identity of the subscriber; means for determining the existence of the personalized ring back tone associated with the subscriber based at least in part on the subscriber identity; means for intercepting the personalized ring back tone at an intercept access point as the personalized ring back tone is transmitted to a caller from a database for storing the personalized ring back tone, the database associated with a network that corresponds to the subscriber, in response to a call placed to the subscriber by the caller; and means for transmitting at least a portion of the personalized ring back tone to a recipient.

Finally, the above mentioned aim and others are also achieved by an article of manufacture comprising a program storage medium having computer readable program code embodied therein for intercepting a transmission of a personalized ring back tone from a network associated with a subscriber to a caller, the computer readable program code in the article of manufacture comprising: computer readable code for causing a computer to receive a command to intercept a personalized ring back tone of a subscriber; computer readable code for causing a computer to identify a subscriber identity of the subscriber; computer readable code for causing a computer to determine the existence the personalized ring back tone associated with the subscriber based at least in part on the subscriber identity; computer readable code for causing a computer to intercept the personalized ring back tone at an intercept access point as the personalized ring back tone is transmitted to a caller from a database for storing the personalized ring back tone, the database associated with a network that corresponds to the subscriber, in response to a call placed to the subscriber by the caller; and computer readable code for causing a computer to transmit at least a portion of the personalized ring back tone to a recipient.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which.

DETAILED DESCRIPTION OF THE INVENTION

As shown in the drawings for the purposes of the illustration, the invention may be embodied in systems and methods for intercepting a transmission of at least one personalized ring back tone to a caller from a network associated with a subscriber. These embodiments are capable of intercepting a personalized ring back tone from existing standardized telephone networks. Embodiments of the invention allow for interception of call content data associated with the personalized ring back tone.

Figure 1:
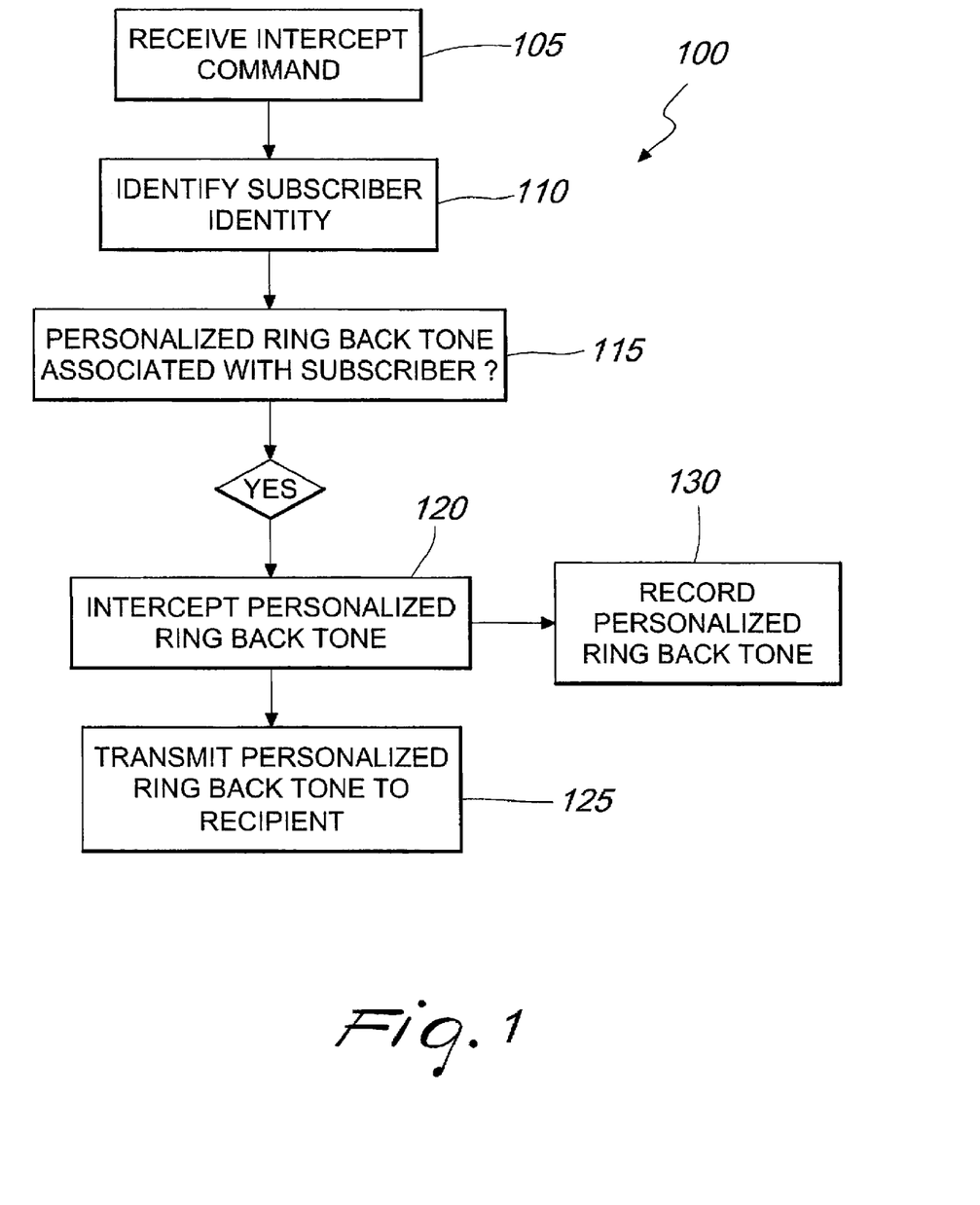
FIG. 1 is a flowchart depicting a method for intercepting a transmission of a personalized ring back tone from a network associated with a subscriber to a caller in accordance with an embodiment of the invention.

In brief overview, FIG. 1 is a flowchart depicting a method 100 for intercepting a transmission of at least one personalized ring back tone to a caller from a network associated with a subscriber in accordance with an embodiment of the invention.

The method includes a first step of receiving a command to intercept a personalized ring back tone of a subscriber (STEP 105).

The command to intercept a personalized ring back tone may be in the form of a warrant authorizing an electronic wire tap. The command may be electronically, verbally, or manually received. The command may also be in the form of an electronic communication received from a third party.

Any signal or indication ordering the interception of a personalized ring back tone of a subscriber that is received by method 100 may be considered to be receiving a command (STEP 105). A subscriber is generally any person or entity that subscribes to personalized ring back tone service. For example, a subscriber may be a cellular telephone user with personalized ring back tone service.

Method 100 next includes the step of identifying a subscriber identity of the subscriber (STEP 110). Generally the subscriber identity includes information that uniquely identifies the subscriber.

For example, this may include identifying or determining a subscriber account number associated with the subscriber. Subscriber identity information may be obtained from the network used for calls to or from the subscriber. In a related embodiment, subscriber identity may be obtained with the assistance of storage devices or nodes associated with the network, such as a Home Location Register (HLR).

Method 100 continues by determining the existence of a personalized ring back tone associated with the subscriber, based at least in part on the subscriber identity (STEP 115). Typically, this step verifies the existence of a personalized ring back tone associated with the subscriber. This may be accomplished by processing the subscriber identity for information that verifies the existence of a personalized ring back tone associated with the subscriber. Determining the existence of the personalized ring back tone (STEP 115) may also include extracting data from the telephone network used in association with the telephone call to the subscriber.

After receiving an intercept command (STEP 105), identifying a subscriber identity (STEP 110) and determining the existence of a personalized ring back tone associated with the subscriber based at least in part on the subscriber identity (STEP 115), method 100 proceeds by intercepting the personalized ring back tone at an intercept access point (STEP 120).

Generally, intercepting the personalized ring back tone at an intercept access point (STEP 120) may occur at any time as the personalized ring back tone is transmitted to a caller from a database for storing the personalized ring back tone. Generally, intercepting the personalized ring back tone (STEP 120) includes any form of accessing, duplicating, replicating, copying, or diverting the personalized ring back tone as it is transmitted from the database to the caller. This may include electronic interception of the personalized ring back tone.

Typically, the database is associated with the network that corresponds to the subscriber. Intercepting the personalized ring back tone (STEP 120) may therefore include intercepting other information such as call content data associated with the personalized ring back tone.

Intercepting the personalized ring back tone (STEP 120) generally does not prohibit the transmission of the personalized ring back tone to the caller, so the caller may still hear the personalized ring back tone that the subscriber intended for the caller to hear. Furthermore, both the caller and the subscriber are typically unaware that the personalized ring back tone has been intercepted. In an alternate embodiment the intercepting step (STEP 120) does prohibit the transfer of the personalized ring back tone to the caller. In this alternate embodiment, the caller may for example hear the standard "ring . . . ring" ring back tone instead of the personalized ring back tone the subscriber intended the caller to hear.

Method 100 further includes the step of transmitting at least a portion of the personalized ring back tone to a recipient (STEP 125).

All or a portion of the personalized ring back tone and associated call content data may be transmitted to a recipient. Generally, transmitting step (STEP 125) includes transmission by any means. For example, the transmission may be electronic, wired, wireless, by form of a hard copy print out that is then transmitted or delivered to a recipient, or data stored in an electronic medium that is then transmitted or delivered to a recipient.

The contents of the personalized ring back tone may be put in a different medium than the medium used for transmitting (STEP 125). For example, a personalized ring back tone may be an audio file, but the portion of the personalized ring back tone transmitted to the recipient may be in the form of a transcript of the audio file.

In other embodiments, the personalized ring back tone is transmitted to a recipient in the same medium received by the caller or the personalized ring back tone may be transmitted to the receiver over a network, such as for example the Internet, a local area network, a wide area network, or an intranet.

In yet other embodiments, the transmission (STEP 125) may include the use of an antenna to transmit the intercepted personalized ring back tone.

Transmitting the personalized ring back tone to a recipient (STEP 125) generally includes outputting the intercepted personalized ring back tone in any medium and in any manner so that the personalized ring back tone or an indication of its contents is directed to a recipient.

Following the interception of the personalized ring back tone (STEP 120), an embodiment of the invention also includes recording the contents of the personalized ring back tone (STEP 130). Recording the personalized ring back tone (STEP 130) may include recording all or a portion of the personalized ring back tone, and in certain embodiments the personalized ring back tone may be only temporarily recorded. Recording (STEP 130) may also include recording the personalized ring back tone in any medium. For example, a personalized ring back tone that includes an audio file may be recorded in transcript form or as an audio file.

Any combination of receiving an intercept command (STEP 105), identifying subscriber identity (STEP 110), determining the existence of a personalized ring back tone (STEP 115), intercepting the personalized ring back tone (STEP 120), transmitting the personalized ring back tone to a recipient (STEP 125), and recording the personalized ring back tone, (STEP 130) may be implemented by a computer, which is generally a device with a central processing unit that may be programmed to perform logic operations.

A personalized ring back tone may include associated call content data. For example, the call content data may include the telephone number of the subscriber, a date of transmission of the personalized ring back tone to the caller, the time of transmission of the personalized ring back tone to the caller, or the geographic location of either the subscriber or the caller when the personalized ring back tone is transmitted to the caller.

In the embodiments where the personalized ring back tone includes the associated call content data, the call content data is defined herein as being integral to and part of the personalized ring back tone itself. When a personalized ring back tone is intercepted and/or transmitted, at least some call content data is also intercepted and or transmitted.

Figure 2:
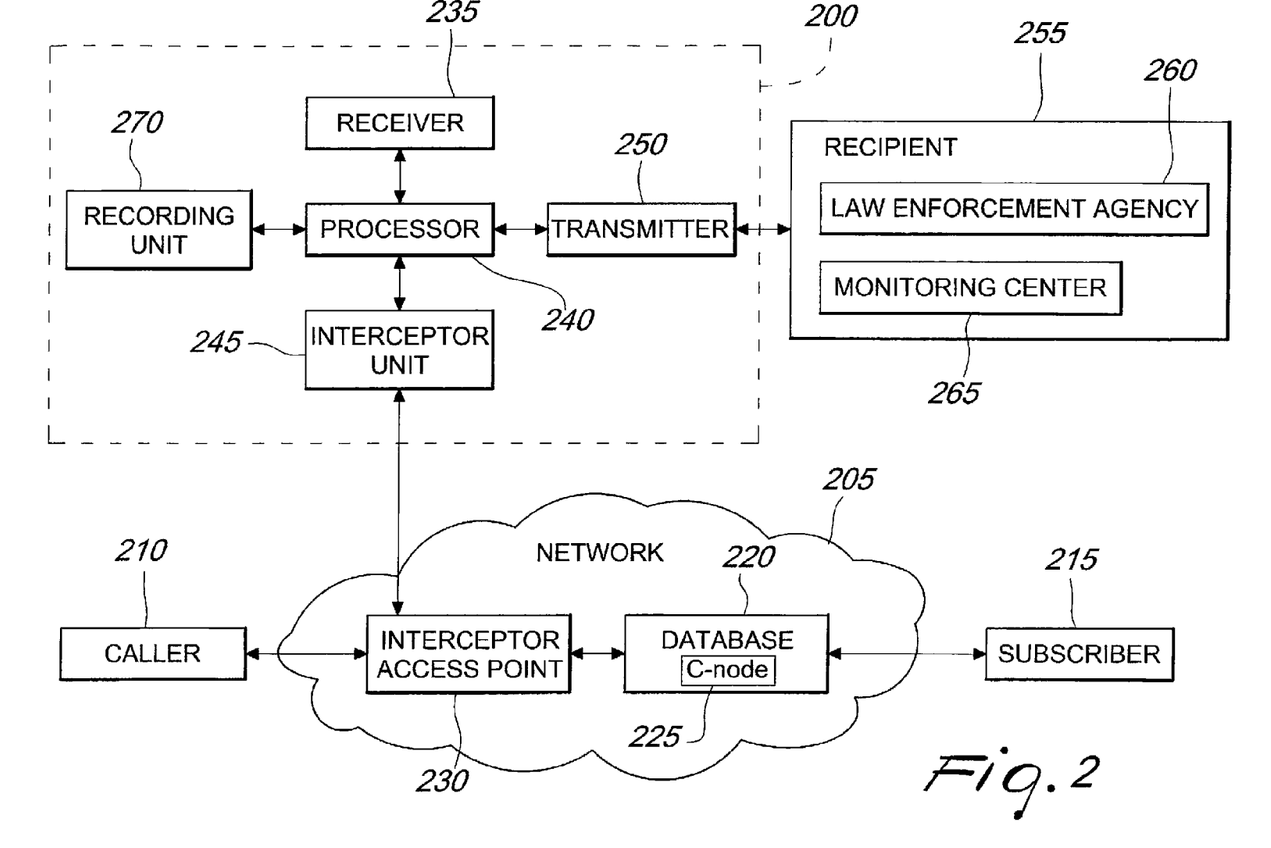
FIG. 2 is a block diagram depicting a system for intercepting a transmission of a personalized ring back tone from a network associated with a subscriber to a caller in accordance with an embodiment of the invention.

In brief overview, FIG. 2 is a block diagram depicting a system 200 for intercepting a transmission of a personalized ring back tone from a network 205 associated with a subscriber 215 to a caller 210 in accordance with an embodiment of the invention. System 200 generally interacts with a network 205.

In a general embodiment, system 200 is external to network 205. However, system 200 may be included within network 205.

Generally, network 205 may include any standardized communication network operable on any of the Third Generation Partnership Project (3GPP), European Telecommunications Standards Institute (ETSI), American National Standards Institute (ANSI) or other standard telecommunication network architecture.

Network 205 may include a Global System for Mobile communications (GSM) network, which, in turn, may include General Packet Radio Service (GPRS) high speed packet switching technology.

In other embodiments, network 205 includes a Code Division Multiple Access (CDMA) wireless network, a Universal Mobile Telecommunication System (UMTS) standard network, a local area network (LAN), wide area network (WAN), the Internet, or an Intranet.

Network 205 may also include any network compatible with a Third Generation Partnership Project (3GPP) specifications.

Network 205 may be fixed, mobile, or digital. Generally, network 205 may include any communications network that enables the connection of a call placed from caller 210 to subscriber 215.

Caller 210 is generally a person or entity with a telephone or other communication device such as a Personal Digital Assistant (PDA) who places a call to subscriber 215. Caller 210 may place the call from any source, such as a cellular telephone, conventional land line telephone, PDA or over the Internet, using for example a Voice Over Internet Protocol (VoIP) service.

Subscriber 215 is generally a person or entity with a telephone or other communication device to whom the call is placed. Subscriber 215 may use a cellular telephone, conventional land line telephone, PDA, or subscriber 215 may receive communication by other means, such as for example through an Internet VoIP service.

When VoIP services are utilized, a communication device may be defined as a computer, where the computer is generally capable of playing audio files to a listener, for example by use of speakers, and also receiving audio files from an operator, such as words inputted into the computer by means of a headset or microphone. Subscriber 215 typically has personalized ring back tone service.

The personalized ring back tones associated with subscriber 215 are stored on network 205. Generally, the personalized ring back tone is transmitted to caller 210 by network 205 in response to a call placed by caller 210 to subscriber 215. System 200 interacts with network 205 to intercept the personalized ring back tone during this transmission.

In a typical embodiment, the transmission of the personalized ring back tone from network 205 to caller 210 is completed even though the personalized ring back tone is intercepted. In other words, the interception of the personalized ring back tone does not prevent caller 210 from hearing personalized ring back tone that subscriber 215 intended for caller 210 to hear. However, the interception of the personalized ring back tone may prevent caller 210 from receiving the personalized ring back tone.

Network 205 that system 200 interacts with when intercepting a personalized ring back tone also includes at least one database 220. Database 220 is generally the portion of network 205 where the personalized ring back tones associated with subscriber 215 are electronically or digitally stored.

In various embodiments database 220 includes at least one C-node 225. The personalized ring back tones are stored in C-node 225, which is generally a database node of network 205. Generally, any type of file may be uploaded to C-node 225 as a personalized ring back tone by subscriber 215 in order to pass information to caller 210.

Network 205 also includes an intercept access point 230. Generally, as a personalized ring back tone is routed through network 205 from either database 220 or C-node 225 to caller 210 in response to a telephone call placed by caller 210 to subscriber 215, the personalized ring back tone is routed through an area of the network where it is susceptible to authorized interception.

This portion of network 205 where the personalized ring back tone is susceptible to interception is known as intercept access point 230. Generally intercept access point 230 the point of interface between network 205 and system 200. This is typically the location where system 200 interacts with network 205 to intercept the personalized ring back tone.

System 200 typically includes at least one receiver 235. Generally, receiver 235 is any device capable of receiving or accepting incoming signals, data, or commands.

Receiver 235 may be a component of a computer or other device used to implement system 200. Alternatively, receiver 235 may be a stand alone device capable of both receiving and transmitting commands or data. Generally, receiver 235 may receive a command to intercept all personalized ring back tones and/or associated call content data that originate from a subscriber in electronic form from a remote source, or alternatively, receiver 235 may receive a coin d directly entered into receiver 235 by, for example, a human operator.

A human operator may directly input into receiver 235 a command to intercept a personalized ring back tone of a subscriber. Generally, the command stems from a search warrant or other authorization to intercept a personalized ring back tone of a subscriber originating from a government or authorized institution. This command may be communicated directly from the authorized institution to receiver 235. The command may also be communicated by an intermediary, such as a human operator who receives the command from an authorized source, and then inputs the command to system 200 via receiver 235.

System 200 also includes at least one processor 240. Generally, processor 240 is any logic device capable of data manipulation, such as a microprocessor chip capable of data processing.

Processor 240 may be included as a central processing unit of a computer. Processor 240 generally receives as input from receiver 235 the command to intercept a personalized ring back tone of a subscriber and is generally capable of identifying a subscriber identity of the subscriber.

A subscriber identity includes characteristics capable of uniquely identifying any particular subscriber. For example, a subscriber identity may include an account number, a telephone number or other similar information.

Processor 240 can identify the subscriber identity of subscriber 215 targeted for personalized ring back tone interception by querying network 205 associated with subscriber 215. In some embodiments, processor 240 is capable of determining the existence of the personalized ring back tone associated with the subscriber, as well as any associated call content data based at least in part on the subscriber identity.

Generally, processor 240 directly or indirectly communicates with network 205 associated with subscriber 215 to determine the existence of at least one personalized ring back tone associated with subscriber 215. this determination may be made with the assistance of a Home Location Register (HLR) included within network 205. Other network 205 components may be queried to make this determination, such as for example the location on network 205 where the personalized ring back tone is stored or transmitted to or from.

System 200 also includes an interceptor unit 245. Interceptor unit 245 is generally responsible for interacting with network 205 and processor 240 to intercept the personalized ring back tone as the personalized ring back tone is transmitted through network 205 and to a caller 210. Interceptor unit 245 may also intercept call content data.

Interceptor unit 245 and receiver 235 may both be included in processor 240. In certain embodiments, interceptor unit 245 includes a logic device capable of connecting with the network to facilitate the interception of the personalized ring back tone.

Interceptor unit 245 may be an interface between system 200 and network 205. Interceptor unit 245 is generally capable of intercepting any signal, including audio, video, or picture files.

System 200 also includes at least one transmitter 250. Typically, transmitter 250 sends or transmits the intercepted personalized ring back tone to a recipient 255.

Transmitter 250 may transmit call content data associated with the personalized ring back tone. Transmitter 250 generally is capable of transmitting the personalized ring back tone in any manner. This may include electronic, wired, or wireless transmission. Transmitter 250 may transmit the personalized ring back tone in any medium, including a medium different from the original medium of the personalized ring back tone.

Transmitter 250 is preferably capable of transmitting audio, picture, or video signals. In an alternate embodiment transmitter 250 may include a printer for printing the contents of the intercepted personalized ring back tone, where the printed contents are then transmitted to recipient 255.

Transmitter 250 may also include a separate device for transmitting. In other embodiments, transmitter 250 may be included in the same device as processor 240, receiver 235, or interceptor unit 245.

Recipient 255 is generally the agency or person authorized to receive the intercepted personalized ring back tone. Recipient 255 is typically not caller 210. Generally, the authorization for recipient 255 to receive an intercepted personalized ring back tone is granted by a government or governmental organization.

Recipient 255 may be the entity that sent the initial command, received by receiver 235, to intercept a personalized ring back tone. Generally, recipient 255 is external to system 200 and transmitter 250 acts as the interface between system 200 and recipient 255. However, recipient 255 may be included in system 200.

Recipient 255 may include at least one law enforcement agency 260. In various embodiments, there may be more than one recipient 255, and multiple recipients 255 may not be aware of each others existence.

Multiple recipients 255 may also receive different portions of the personalized ring back tone, or different call content data. Recipient 255 may also include a monitoring center 265. Generally, monitoring center 265 is designed to receive at least one intercepted personalized ring back tone and the contents of the intercepted personalized ring back tone are monitored. Recipient 255 is also generally able to receive any call content data.

System 200 may include a recording unit 270. Generally, recording unit 270 is a device capable of recording the intercepted personalized ring back tone in any medium.

Recording unit 270 may record the intercepted personalized ring back tone in a medium different than the medium in which the personalized ring back tone is stored in database 220. Recording unit 270 may also record call content data. Recording unit 270 may be either a separate device in system 200, or it may be part of a single device that includes processor 240 or other elements of system 200, and it may record all or part of the personalized ring back tone or associated call content data.

In certain embodiments, the recording may be temporary. For example, recording unit 270 may record the personalized ring back tone until confirmation is received by system 200 that recipient 255 has successfully received the intercepted personalized ring back tone, at which time any recording may be deleted.

Any combination of processor 240, receiver 235, interceptor unit 245, transmitter 250, and recording unit 270 may be included in a single device, such as a computer.

Connections from database 220, which may include C-node 225 through network 205 to recipient 255 and connections from database 220 to caller 210 may generally be in the form of a serial setup, a parallel setup, or semi-serial setup. In the case of a serial setup, a response from recipient 255, or a timeout of the serial setup timer in the event there is not response, is expected before the personalized ring back tone is sent from database 220 to caller 210. In such a case, a connection from database 220 to the recipient 255 already exists and any in-band call content or other information preceding the personalized ring back tone will also be received by recipient 255, in addition to any telephone conversation that follows.

In case of a parallel setup, connection from database 220 to the recipient 255 and a connection from database 220 to the to caller 210 exist in parallel.

A situation where the personalized ring back tone begins to play before the connection from database 220 to recipient 255 is complete is an accepted parameter for the systems and the methods of the invention. Such a situation generally lasts for a fraction of a second and useful personalized ring back tone an call content data is still typically received by recipient 255.

In the case of a semi-serial setup, connection from the database 220 to recipient 255, and a connection from database 220 to caller 210 exist in parallel until a continuity test message is received from the caller 210 indicating a call has been placed. Once this message is received, a response from recipient 255 or a timeout of the serial setup is expected before completing the connection from caller 210 to subscriber 215. In such a case, any in-band call content or other information preceding the personalized ring back tone may be received by receiving center 255. In the event the personalized ring back tone is not played at all, possibly through network 205 failure, recipient 255 will receive the intercepted telephone call in a normal fashion.

In certain embodiments, intercept access point 230 may include at least one one administration function (ADMF) (not shown in the Figures).

The ADMF generally enables multiple interceptions of subscriber 215 by a plurality of recipients 255, such as different law enforcement agencies 260. The ADMF generally ensures that interceptor unit 245 only intercepts authorized information at intercept access point 230. For example, ADMF may be used to ensure separation of call content data from different recipients 255 in the event different recipients 255 are only authorized to receive specific call content data.

Network 205 may have multiple intercept access points 230. One interceptor unit 245 may be used to intercept the personalized ring back tone and/or associated call content that is destined for multiple recipients 255. In this illustrative embodiment, processor 240 in conjunction with transmitter 250 distribute the proper intercepted personalized ring back tone and associated call content to the proper recipient 255 so that each recipient 255 receives only the data that the particular recipient 255 has been authorized to receive.

ADMF may interact with system 200 to regulate call content data related to at least one of the subscriber identify, the address for delivery of intercepted information such as recipient 255 address, the subset of information which is to be delivered, a unique second delivery function activation identity, which uniquely identifies the activation for a second intercept command, the intercept activation, and a warrant reference number, if required.

In certain embodiments, Intercept Related Information (IRI, or Events) are necessary at the beginning of a call, the end of a call, for all supplementary services during a call, and for information that is not call associated. Events may be call related or non-call related and may generally include any data related to personalized ring back tones, such as date, time, or location, as well as the content of the personalized ring back tones themselves. If there is an Event to or from a subscriber, interceptor unit 245 intercepts the relevant data, which is then sent by system 200 to recipient 255. System 200 is also capable of intercepting personalized ring back tones in a Packet Switching (PS) domain.

Figure 3:
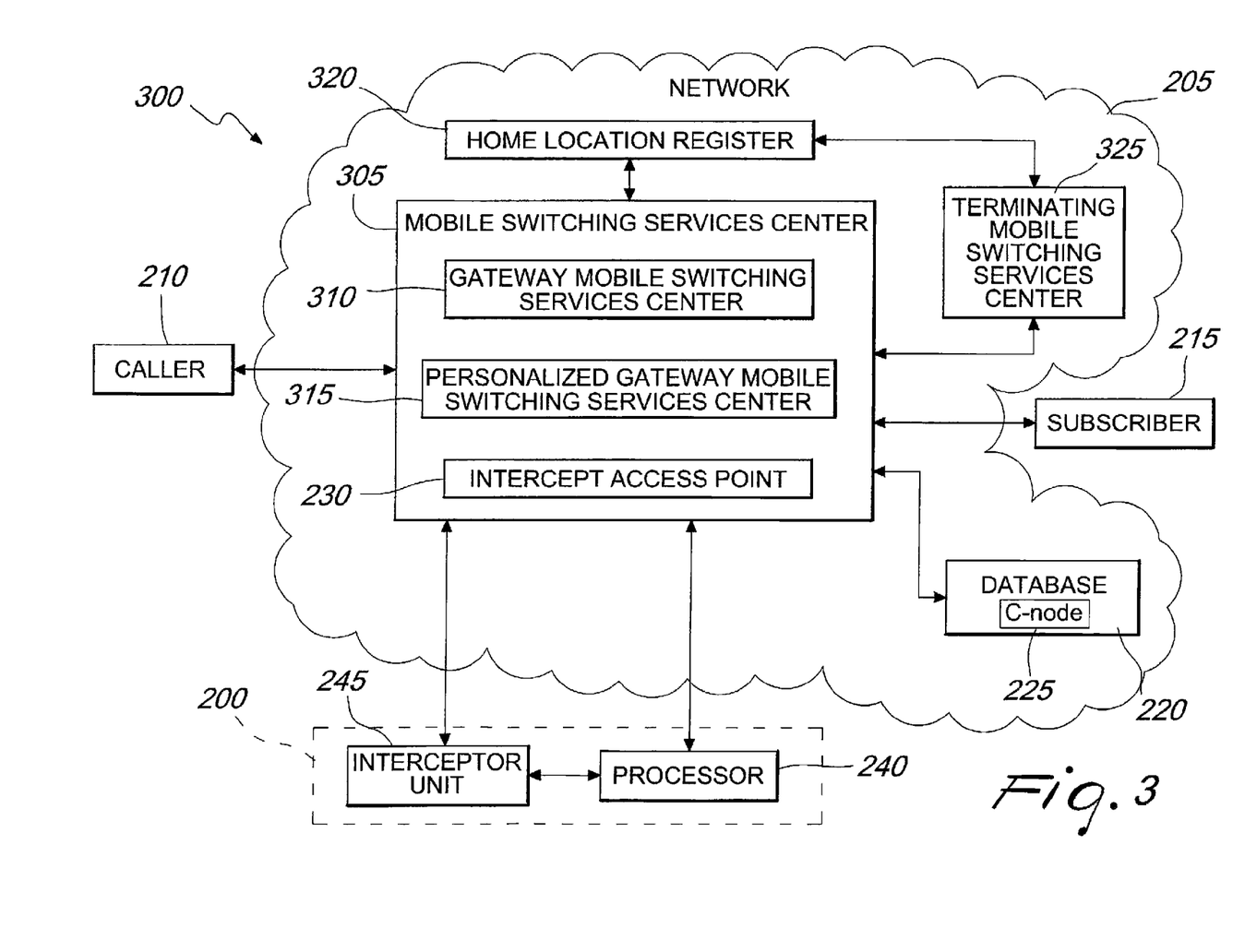
FIG. 3 is a block diagram that depicts the network from which the personalized ring back tone is intercepted, and network interaction with a system for intercepting a transmission of a personalized ring back tone from the network to a caller in accordance with an embodiment of the invention.

In brief overview, FIG. 3 is a block diagram of a system 300 that depicts in more detail components of network 205 and the interaction between network 205 and system 200 in accordance with an embodiment of the invention.

Network 205 may include a Mobile Switching Services Center (MSC) 305. Mobile Switching Services Center 305 may also be referred to as Mobile Switching Center 305. Generally, Mobile Switching Center 305 is a core element of network 205 for handling incoming cellular telephone calls.

Mobile Switching Center 305 coordinates and sets up calls to and from subscriber 215 via network 205. More specifically, Mobile Switching Center 305 is a central component of network 205 and may include a telephone exchange that provides circuit switched calling and mobility management of a cellular telephone that is roaming within an area served by network 205.

In certain embodiments, Mobile Switching Center 305 includes a normal network switching node, such as an Integrated Services Digital Network (ISDN) switch, which additionally provides the functionality needed to handle a mobile (cellular) subscriber.

Mobile Switching Center 305 may also include Gateway Mobile Switching Center (GMSC) 310, which generally handles incoming calls to network 205 where the incoming calls are arriving from external networks. GMSC 310 is generally a switch that is able to obtain routing information relating to the telephone call.

This call routing and other information may be obtained by use of a Home Location Register (HLR) 320. Generally, HLR 320 is a central database that contains details such as administrative information of subscriber 215 to assist with call routing and subscriber 215 roaming. HLR 320 assists network 205 and MSC 305 in locating subscriber 215. HLR 320 may include a central database that contains details of each mobile phone subscriber that is authorized to use a Global System for Mobile communications (GSM) core network.

The HLR is generally a database associated with a GSM network that generally contains the administrative information of all subscribers registered in the corresponding GSM network, as well as the current geographic location of the mobile phone associated with subscriber 215.

The GSM core network is the heart of the GSM network that allows mobile phones to communicate with each other and land line telephones in the wider telecommunications network by allowing circuit switching to handle telephone calls, short message services (text messaging) and circuit switched data calls. GSM is generally a mobile telephone network.

Once a call has been routed by the HLR 320 to, for example, MSC 305, a Visitor Location Register (VLR) and MSC 305 may route the call to C-node 225 or database 220 for transmission of the personalized ring back tone. In this illustrative example, MSC 305 may act as intercept access point 230.

Information gleaned from monitoring the personalized ring back tone, such as the personalized ring back tone itself and associated call content, may include information such as the date of the monitored transmission, time of the monitored transmission, subscriber number that is being monitored, International Mobile Subscriber Identity (IMSI) of the monitored object, monitored object type, network identifier, access location, call identifier, recipient identity, case identity, an indication whether any in-band information such as a personalized ring back tone is available from C-node 225 or database 220, or an internal fault indicator.

In various embodiments, Mobile Switching Center 305 may function as Gateway Mobile Switching Center 310. Mobile Switching Center 305 may also include a Personalized Gateway Mobile switching Services Center (P-GMSC) 315. Generally, P-GMSC includes GMSC 310 adapted to handle personalized ring back tones. In embodiments including both GMSC 310 and P-GMSC 315, if GMSC 310 is not capable of handling personalized ring back tones, they are routed by a router (not shown) to P-GMSC 315 within network 205 for eventual transmission to caller 210 and potential interception by interceptor unit 245. HLR 320 may act as the router in this circumstance.

In various embodiments a call placed by caller 210 to subscriber 215 is routed to database 200, which may include C-node 225. This routing may be handled by MSC 305, GMSC 210, or P-GMSC 315. Any of these elements may route the call to database 220, where the personalized ring back tone is retrieved and transmitted to caller 210.

When a call to subscriber 215 under electronic surveillance enters a MSC 305, GMSC 210, or P-GMSC 315 a connection is set up so that when database 220 transmits the personalized ring back tone to MSC 305, GMSC 210, or P-GMSC 315, interceptor unit 245 may intercept the personalized ring back tone while still allowing for the personalized ring back tone to be transmitted to caller 210. Database 220 is generally released when subscriber 215 answers the telephone call, and at this point transmission of the personalized ring back tone ceases and the electronic monitoring of the connected telephone call will proceed.

Mobile Switching Center 305 may include intercept access point 230 and/or is located external to Mobile Switching Center 305. Generally, intercept access point 230 is the point in network 205 at which the personalized ring back tone is intercepted by interceptor unit 245. Any aspect or component of Mobile Switching Center 305 may act as intercept access point 230, including for example GMSC 310 or P-GMSC 315.

Network 205 may also include a Terminating Mobile Switching Services Center (TMSC) 325. TMSC 325 may be included within any of MSC 305, GMSC 310, or P-GMSC 315, and may also act as intercept access point 230.

TMSC 325 may be a separate network node. Generally, TMSC 325 is a mobile switching center that includes a Visitor Location Register (VLR) (not shown) and is used in conjunction with HLR 320 and MSC 305 to locate a mobile subscriber 215 for call control and provision of prescribed services such as personalized ring back tones.

To exemplify an illustrative embodiment of system 300, caller 210 places a call to subscriber 215. Subscriber 215 may be a cellular telephone subscriber who uses network 205: subscriber 215 may be said to be a member of, or subscriber to, network 205.

The call from the caller is routed by a router (not shown) to Mobile Services Center 305. Generally, Mobile Services Center 305, which may include Gateway Mobile Services Center 310 and/or Personalized Gateway Mobile Services Center 315 works with other network 205 components such as Home Location Register 320 and/or Terminating Mobile Services Center 325 to locate subscriber 215 and determine if subscriber 215 has designated a personalized ring back tone for caller 210.

If a personalized ring back tone exists and has been designated, it is retrieved from database 220 and sent to Mobile Services Center 305. Continuing with this illustrative embodiment, at this point interceptor unit 245 will intercept the personalized ring back tone at intercept access point 230. After interception, network 205 generally proceeds to deliver the personalized ring back tone to caller 210, and system 200 generally proceeds to transmit the intercepted personalized ring back tone to a recipient.

In an alternate embodiment, system 200 may intercept all of the personalized ring back tones delivered by network 205 to caller 210. In such an alternate embodiment, it is caller 210, and not subscriber 215, who is the subject of a lawful intercept command. In this embodiment, all personalized ring back tones from a plurality of subscribers are intercepted at intercept access point 230 by interceptor unit 245. In other words, it is all of the personalized ring back tones to caller 210 regardless of the source of the personalized ring back tone (i.e., regardless of the subscriber), that may be intercepted.

All the personalized ring back tones originating from subscriber 215 may be intercepted at intercept access point 230 by interceptor unit 245 regardless of the intended recipient of the telephone call.

An intercepted personalized ring back tone and/or associated call content data may be transmitted from intercept access point 230 to recipient 255 by means of a delivery function node.

Generally, the delivery function node formats the received personalized ring back tone and/or associated call content data over an interface, such as for example a Third Generation Handover Interface (3GHI) in accordance with programming language Abstract Syntax Notation One (ASN.1) description provided below in Table 1, where ASN.1 is generally a formal programming language describing messages to be exchanged over an extensive range of networks and network architectures, including network 205.

TABLE 1

```
IRI-Parameters::= SEQUENCE
{
    hi2DomainId    [0] OBJECT IDENTIFIER, -- 3GPP HI2 domain
    iRIversion     [23] Enumerated
    {
```

TABLE 1-continued

```
        version2(2),
        ...
    }Optional,
        -- if not present, it means version 1 is handled
    lawfulInterceptionIdentifier   [1] LawfulInterceptionIdentifier,
        -- This identifier is associated to the target.
    time Stamp                     [3] TimeStamp,
        -- date and time of the event triggering the report)
    initiator                      [4] ENUMERATED
    {
        not-Available         (0),
        originating-Target    (1),
            -- in case of GPRS, this indicated that the PDP context activation
            -- or deactivation is MS requested
        terminating-Target    (2),
            -- in case of GPRS, this indicated that the PDP context activation
or
            -- or deactivation is network initiated
        ...
    } OPTIONAL,
    locationOfTheTarget            [8] Location OPTIONAL,
        -- location of the target subscriber
    partyInformation               [9] SET SIZE (1..10) OF PartyInformation OPTIONAL,
        -- This parameter provides the concerned party, the identity(ies) of the
party
        --) and all the information provided by the party.
    serviceCenterAddress           [13] PartyInformation OPTIONAL,
        -- e.g. in case of SMS message this parameter provides the address of the
relevant
        -- server within the calling (if server is originating) or called (if
server is
        -- terminating) party address parameters
    sMS                            [14] SMS-report OPTIONAL,
        -- this parameter provides the SMS content and associated information
    national-Parameters            [16] National-Parameters OPTIONAL,
    gPRSCorrelationNumber          [18] GPRSCorrelationNumber OPTIONAL,
    GPRSevent                      [20] GPRSEvent OPTIONAL,
        -- This information is used to provide particular action of the target
        -- such as attach/detach
    sgsnAddress                    [21] DataNodeAddress OPTIONAL,
    gPRSOperationErrorCode         [22] GPRSOperationErrorCode OPTIONAL,
    ggsnAddress                    [24] DataNodeAddress OPTIONAL,
    qOS                            [25] UmtsQos OPTIONAL,
    networkIdentifier              [26] Network-Identifier OPTIONAL,
    sMSOriginatingAddress          [27] DataNodeAddress OPTIONAL,
    sMSTerminatingAddress          [28] DataNodeAddress OPTIONAL,
    iMSevent                       [29] IMSEvent OPTIONAL,
    sIPMessage                     [30] OCTET STRING OPTIONAL,
    servingSGSN-number             [31] OCTET STRING (SIZE (1..20))    OPTIONAL,
    serving SGSN-address           [32] OCTET STRING (SIZE (5..17))    OPTIONAL,
        -- Octets are coded according to 3GPP TS 23.003 [25]
    pRBTinfo                       [33] PRBTinfo OPTIONAL,
    ...
}
PRBTinfo::= SEQUENCE
{
    prbtEvent              [0]    PRBTevent,
    faultReason            [1]    PRBTfaultReason OPTIONAL,
    ...
}
PRBTevent::=ENUMERATED
{
    pRBTplayed                (0),
    pRBTnotPlayed             (1),
    pRBTnotPlayedDueToFault   (2),
    ...
}
PRBTfaultReason ::= ENUMERATED
{
    networkCongestion      (0),
    otherFailure           (1),
    ...
}
```

This formatted information may then be transmitted by transmitter 250 to recipient 255.

In FIGS. 1 through 3, the enumerated items are shown as individual elements. In actual implementations of the invention, however, they may be inseparable components of other electronic devices such as a digital computer. Thus, actions described above may be implemented in software that may be embodied in a storage medium. The storage medium includes data signals embodied in one or more of, a computer disk (magnetic, or optical (e.g., CD or DVD or both), non-volatile memory, tape, a system memory, and a computer hard drive.

From the foregoing, it will be appreciated that the systems and methods provided by the invention afford a simple and effective way to lawfully intercept personalized ring back tones. The systems and methods according to embodiments of the invention are able to intercept personalized ring back tones from existing, standard networks. This increases efficiency and compatibility, and lowers cost.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than the foregoing description, and all changes that come within the meaning and range of equivalency of the claims are therefore intended to be embraced therein.

The disclosures in European Patent Application No. 04445128-4 from which this application claims priority are incorporated herein by reference.

The invention claimed is:

1. A method for intercepting a transmission of a personalized ring back tone from a network associated with a subscriber to a caller, comprising:
   receiving a command to intercept a personalized ring back tone of a subscriber;
   identifying a subscriber identity of the subscriber;
   determining the existence of the personalized ring back tone associated with the subscriber based at least in part on the subscriber identity, wherein
       the determining further comprises determining if the subscriber has customized a personalized ring back tone for a specified caller;
   intercepting the personalized ring back tone at an intercept access point as the personalized ring back tone is transmitted to the specified caller from a database for storing the personalized ring back tone, the database associated with a network that corresponds to the subscriber, in response to a call placed to the subscriber by the specified caller; and
   transmitting at least a portion of the personalized ring back tone to a recipient.

2. The method of claim 1, further comprising recording at least temporarily at least a portion of the personalized ring back tone transmitted to the specified caller from the database.

3. The method of claim 1, wherein determining the existence of the personalized ring back tone associated with the subscriber based at least in part on the subscriber identity comprises determining the existence of call content data associated with the personalized ring back tone.

4. The method of claim 3, comprising:
   intercepting the call content data associated with the personalized ring back tone, the call content data comprising at least one of a telephone number associated with the subscriber, a date of transmission of the personalized ring back tone to the specified caller from the database, a time of transmission of the personalized ring back tone to the specified caller from the database, and a geographic location of the subscriber when the personalized ring back tone is transmitted to the specified caller from the database; and
   transmitting at least a portion of the call content data associated with the personalized ring back tone to the recipient.

5. The method of claim 1, wherein determining the existence of the personalized ring back tone associated with the subscriber based at least in part on the subscriber identity comprises determining, by use of a Home Location Register (HLR), the existence of the personalized ring back tone associated with the subscriber.

6. The method of claim 1, comprising intercepting the personalized ring back tone at the intercept access point as the personalized ring back tone is transmitted to the specified caller from the database, wherein the database for storing the personalized ring back tone comprises a C-node for storing the personalized ring back tone.

7. The method of claim 1, comprising intercepting the personalized ring back tone at the intercept access point as the personalized ring back tone is transmitted to the specified caller from the database, the database associated with a network, wherein the network comprises at least one of a Global System for Mobile Communications (GSM) network and a Code Division Multiple Access (CDMA) wireless network.

8. The method of claim 7, further comprising associating a Mobile service Switching Center (MSC) with the Global System for Mobile Communications network.

9. The method of claim 1, comprising intercepting the personalized ring back tone at the intercept access point as the personalized ring back tone is transmitted to the specified caller from the database, wherein the network comprises a Gateway Mobile Switching Services Center (GMSC).

10. The method of claim 1, comprising intercepting the personalized ring back tone at the intercept access point as the personalized ring back tone is transmitted to the specified caller from the database, wherein the network comprises a Personalized Gateway Mobile Switching Services Center that is adapted to support the existence of the personalized ring back tone.

11. The method of claim 1 wherein transmitting at least a portion of the personalized ring back tone to the recipient, comprises transmitting at least a portion of the personalized ring back tone to the recipient wherein the recipient comprises a law enforcement agency.

12. A system for intercepting a transmission of a personalized ring back tone from a network associated with a subscriber to a caller, comprising:
   a receiver capable of receiving a command to intercept a personalized ring back tone of a subscriber;
   a processor capable of identifying a subscriber identity of the subscriber;
   the processor capable of determining the existence of the personalized ring back tone associated with the subscriber based at least in part on the subscriber identity, wherein
       the determining further comprises determining if the subscriber has customized a personalized ring back tone for a specified caller;
   an interceptor unit for intercepting the personalized ring back tone at an intercept access point as the personalized ring back tone is transmitted to the specified caller from a database for storing the personalized ring back tone, the database associated with a network that corresponds to the subscriber, in response to a call placed to the subscriber by the specified caller; and a transmitter for transmitting at least a portion of the personalized ring back tone to a recipient.

13. The system of claim 12, further comprising a recording unit for at least temporarily recording at least a portion of the personalized ring back tone transmitted to the specified caller from the database.

14. The system of claim 12, wherein the personalized ring back tone comprises an audio file.

15. The system of claim 12, wherein the personalized ring back tone comprises call content data associated with the personalized ring back tone.

16. The system of claim 15, wherein the call content data comprises at least one of a subscriber telephone number associated with the subscriber, a date of transmission of the personalized ring back tone to the specified caller from the database, a time of transmission of the personalized ring back tone to the specified caller from the database, and a geographic location of the subscriber when the personalized ring back tone is transmitted to the specified caller from the database.

17. The system of claim 12, wherein the network comprises a Home Location Register (HLR) in at least indirect communication with the processor to determine the existence of the personalized ring back tone.

18. The system of claim 12, wherein the database for storing the personalized ring back tone comprises a C-node for storing the personalized ring back tone.

19. The system of claim 12, wherein the network comprises at least one of a Global System for Mobile Communications (GSM) network and a Code Division Multiple Access (CDMA) wireless network.

20. The system of claim 19, wherein the Global System for Mobile Communications (GSM) network is associated with a Mobile Services Switching Center (MSC).

21. The system of claim 12, wherein the network comprises a Gateway Mobile Switching Services Center (GMSC) server associated with the intercept access point.

22. The system of claim 12, wherein the network comprises a Personalized Gateway Mobile Switching Services Center server that is adapted to support the existence of the personalized ring back tone.

23. The system of claim 12, wherein the recipient comprises a law enforcement agency employee.

24. A system for intercepting a transmission of a personalized ring back tone, comprising:

means for receiving a command to intercept a personalized ring back tone of a subscriber;

means for identifying a subscriber identity of the subscriber;

means for determining the existence of the personalized ring back tone associated with the subscriber based at least in part on the subscriber identity, wherein the means for determining further comprises means for determining if the subscriber has customized a personalized ring back tone for a specified caller;

means for intercepting the personalized ring back tone at an intercept access point as the personalized ring back tone is transmitted to a specified caller from a database for storing the personalized ring back tone, the database associated with a network that corresponds to the subscriber, in response to a call placed to the subscriber by the specified caller; and means for transmitting at least a portion of the personalized ring back tone to a recipient.

25. A non-transitory storage medium including computer readable instructions, when executed by a processor, the computer readable instructions are configured to:

receive a command to intercept a personalized ring back tone of a subscriber;

identify a subscriber identity of the subscriber;

determine the existence the personalized ring back tone associated with the subscriber based at least in part on the subscriber identity, wherein the instructions configured to determine further comprises instructions configured to determine if the subscriber has customized a personalized ring back tone for a specified caller;

intercept the personalized ring back tone at an intercept access point as the personalized ring back tone is transmitted to specified caller from a database for storing the personalized ring back tone, the database associated with a network that corresponds to the subscriber, in response to a call placed to the subscriber by the specified caller; and transmit at least a portion of the personalized ring back tone to a recipient.

* * * * *

UNITED STATES PATENT AND TRADEMARK OFFICE
CERTIFICATE OF CORRECTION

PATENT NO.         : 8,270,573 B2                                    Page 1 of 1
APPLICATION NO.    : 11/721584
DATED              : September 18, 2012
INVENTOR(S)        : Fiorillo et al.

It is certified that error appears in the above-identified patent and that said Letters Patent is hereby corrected as shown below:

In the Specifications:

In Column 1, Line 52, delete "list will" and insert -- list, will --, therefor.

In Column 2, Line 28, delete "bears" and insert -- hears --, therefor.

In Column 9, Line 24, delete "coin d" and insert -- command --, therefor.

In Column 9, Line 60, delete "this" and insert -- This --, therefor.

In Column 10, Line 26, delete "embodiment" and insert -- embodiment, --, therefor.

In Column 11, Line 27, delete "to the to" and insert -- to the --, therefor.

In the Claims:

In Column 11, Line 49, delete "least one one" and insert -- least one --, therefor.

Signed and Sealed this
Ninth Day of July, 2013

Teresa Stanek Rea
*Acting Director of the United States Patent and Trademark Office*